Patented July 11, 1950

2,514,377

UNITED STATES PATENT OFFICE 2,514,377

1-NITROPHENYL, 2-AMINO, 1,3-PROPANEDIOLS

Harry M. Crooks, Jr., Mildred C. Rebstock, John Controulis, and Quentin R. Bartz, Detroit, Mich., assignors to Parke, Davis & Company, Detroit, Mich., a corporation of Michigan No Drawing. Application February 12, 1949, Serial No. 76,178

13 Claims. (Cl. 260—570.6)

This application is a continuation-in-part of our copending application Serial No. 15,264, filed March 16, 1948, now Patent No. 2,483,884, issued October 4, 1949, and the invention relates to new chemical compounds and to chemical methods useful for their synthesis. More particularly, the invention relates to a new class of organic amino diols and their acid addition salts and to methods for obtaining these products. The amino diol compounds of the invention in their free base form can be represented by the formula,

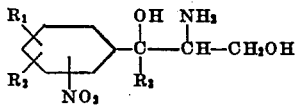

where $R_1$ and $R_2$ are the same or different and represent hydrogen, halogen, lower alkyl or lower alkoxy radicals and $R_3$ is hydrogen or a lower alkyl radical.

It will be appreciated by those skilled in the art that the amino diols of the invention and the starting materials used in their preparation can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [$\psi$] series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatory isomers as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers the notation "unresolved" will be used. However, it should be expressly understood that where no notation appears with a structural formula that the formula should be interpreted in its generic sense, that is, as representing the [l]-$\psi$, [d]-$\psi$, [l]-reg. or [d]-reg. isomers in separated form as well as the [dl]-$\psi$ or [dl]-reg. optical racemates or the total unresolved mixture of structural and optical isomers. Such a formula does not merely represent the unresolved mixture of isomers.

In accordance with the invention amino diols of the above general formula are produced by hydrolyzing an acylated amino diol of formula,

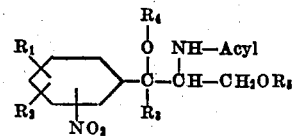

where $R_1$ and $R_2$ are the same or different and represent hydrogen, halogen, lower alkyl or lower alkoxy radicals, $R_3$ is hydrogen or a lower alkyl radical and $R_4$ and $R_5$ are the same or different and represent hydrogen or acyl radicals. The term "acyl" as used herein includes saturated and unsaturated lower aliphatic acyl, halogen substituted lower aliphatic acyl, carboxy substituted lower aliphatic acyl, cyano substituted lower aliphatic acyl, ether substituted lower aliphatic acyl, hydroxy substituted lower aliphatic acyl, benzoyl, substituted benzoyl, araliphatic acyl, furoyl, pyridinoyl and the like.

In carrying out the hydrolysis acidic or alkaline conditions can be used. However, we prefer to hydrolyze using dilute mineral acid since it is more efficient in bringing about hydrolysis in a shorter time. When acidic hydrolytic conditions are used the nitrophenyl substituted amino diol product is present in the reaction mixture in the form of an acid addition salt and it can either be isolated in this form or it can be neutralized and isolated as the free base.

If desired, the hydrolysis may be carried out in a medium containing a water miscible organic solvent such as methanol, ethanol, dioxane, acetone, n-propanol, methyl ethyl ketone and the like.

The reaction may be effected over a wide temperature range but is preferably carried out at the boiling point of the reaction mixture. Some specific examples of the hydrolytic catalysts or reagents which can be employed are hydrochloric acid, hydrobromic acid, hydriodic acid, sulfuric acid, phosphoric acid, sodium hydroxide, potassium hydroxide, lithium hydroxide, barium hydroxide, sodium carbonate, potassium carbonate and the like.

As stated above, the acid addition salts of the amino diols may be prepared directly by hydrolysis. These salts may also be prepared by reaction of the free base with the corresponding organic or inorganic acid. Some examples of these acid addition salts are the hydrochloride, hydrobromide, hydroiodide, sulfate, sulfamate, oxalate, tartrate, citrate, benzoate, maleate, succinate, acetate and the like.

The amino diols of the invention and their acid addition salts are valuable intermediates for the preparation of other organic compounds. They are of particular value as intermediates in the preparation of organic compounds possessing antibiotic activity. For example, [l]-ψ-1-p-nitrophenyl-2-aminopropane-1,3-diol, the compound of Example 3, can be converted by dichloroacetylation to [l]-ψ-1-p-nitrophenyl-2-dichloroacetamidopropane-1,3-diol, a compound possessing outstanding and unique antibiotic activity described and claimed in our copending application Serial No. 76,179, filed on even date herewith, now Patent No. 2,483,885, issued October 4, 1949. This same product can be prepared from [dl]-ψ-1-p-nitrophenyl - 2 - aminopropane-1,3-diol, the compound of Example 2, by resolution of the optical isomers as described and claimed in our copending application Serial No. 76,180, filed February 12, 1949, followed by dichloroacetylation.

The invention is illustrated by the following examples.

Example 1

[a] 100 mg. of the diacetate of [dl]-reg.-1-p-nitrophenyl-2-dichloroacetamidopropane-1,3-diol is heated with 5 cc. of 6 N hydrochloric acid for about three hours. The reaction mixture is evaporated to dryness under reduced pressure to obtain the desired hydrochloride salt of [dl]-reg.-1-p-nitrophenyl - 2 - aminopropane-1,3-diol; M. P. when pure 216–18° C. The formula of this product is,

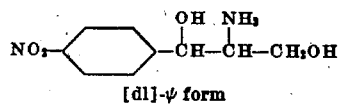

[dl]-reg. form

The free base can be obtained by dissolving the hydrochloride in water and neutralizing the solution with sodium hydroxide to pH 9. The solution is extracted with ethyl acetate and the ethyl acetate evaporated to obtain the free base of [dl]-reg.-1-p-nitrophenyl - 2 - aminopropane-1,3-diol; M. P. 107–9° C. when crystallized from ethanol or ethylene dichloride. The formula of this product is,

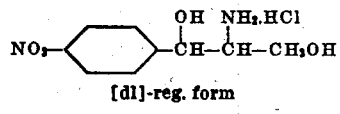

[dl]-reg. form

[b] 8 g. of the triacetate of [dl]-reg.-1-p-nitrophenyl-2-aminopropane-1,3-diol is heated with 400 cc. of 5% hydrochloric acid for about three hours and the reaction mixture evaporated to dryness in vacuo. The residual [dl]-reg.-1-p-nitrophenyl-2-aminopropane-1,3-diol hydrochloride is taken up in a small amount of water, the solution made alkaline to pH 9 with sodium hydroxide solution and the mixture extracted with ethyl acetate. The combined extracts are dried and the ethyl acetate removed by distillation in vacuo to obtain the desired [dl]-reg.-1-p-nitrophenyl-2-aminopropane-1,3-diol.

[c] 5 g. of [dl]-reg. -1-p-nitrophenyl-2-acetamido-3-acetoxypropane-1-ol is heated with 100 cc. of 10% hydrobromic acid for three hours. The reaction mixture is evaporated to dryness in vacuo to obtain the hydrobromide salt of [dl]-reg.-1-p-nitrophenyl - 2 - aminopropane-1,3-diol. The hydrobromide salt is dissolved in water, the solution made alkaline with potassium hydroxide to pH 10 and extracted with ethyl acetate. The ethyl acetate extracts are dried and the ethyl acetate distilled to obtain the desired [dl]-reg.-1-p-nitrophenyl-2-aminopropane-1,3-diol.

Example 2

[a] 2 g. of the triacetate of [dl]-ψ-1-p-nitrophenyl-2-aminopropane-1,3-diol is heated with 100 cc. of 5% hydrochloric acid for two to three hours on a steam bath and then the reaction mixture evaporated to dryness in vacuo. The crystalline hydrochloride salt of [dl]-ψ-1-p-nitrophenyl-2-aminopropane-1,3-diol [M. P. 177.5–8.5° C.] thus obtained is taken up in a small amount of water and the solution made alkaline to pH 9 with sodium hydroxide solution. The solution is extracted with ethyl acetate, the combined extracts dried and the ethyl acetate evaporated to obtain the desired free base of [dl]-ψ-1-p-nitrophenyl-2-aminopropane-1,3-diol; M. P. 140.5° C. The formula of this compound is,

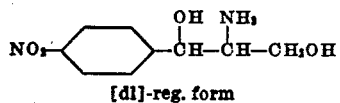

[dl]-ψ form

[b] 4 g. of the tribenzoate of [dl]-ψ-1-p-nitrophenyl-2-aminopropane-1,3-diol is dissolved in 100 cc. of alcoholic 10% hydrochloric acid and the mixture heated for four hours. The reaction mixture is evaporated to dryness in vacuo, treated with 150 cc. of water and the mixture made alkaline to pH 10 with sodium hydroxide. The solution is extracted with ethyl acetate, the ethyl acetate extracts dried and the ethyl acetate distilled to obtain the desired [dl]-ψ-1-p-nitrophenyl-2-aminopropane-1,3-diol.

This same product can be obtained by substituting an equivalent amount of the diacetate of [dl] - ψ-1-p-nitrophenyl - 2 - benzamidopropane-1,3-diol in the above procedure for the tribenzoate used.

1 g. of [dl]-ψ-1-p-nitrophenyl-2-aminopropane-1,3-diol is dissolved in an aqueous solution containing one equivalent of succinic acid and the resulting solution evaporated to dryness in vacuo. The succinate salt of [dl]-ψ-1-p-nitrophenyl-2-aminopropane-1,3-diol thus obtained can be purified if desired by recrystallization from water; M. P. 156–7° C.

[c] 3 g. of [dl]-ψ-1-p-nitrophenyl-2-acetamido-3-acetoxypropane-1-ol is heated with 50 cc. of 5% hydrochloric acid for four hours. The reaction mixture is evaporated to dryness in vacuo to obtain the desired hydrochloride salt of [dl]-ψ-1-p-nitrophenyl - 2 - aminopropane - 1,3-diol. If desired the free base may be obtained by dissolving the hydrochloride salt in water making the solution alkaline to pH 10, extracting with ethyl acetate from the extract.

If desired sulfuric acid can be substituted for the hydrochloric acid used in the above procedure.

[d] 2 g. of [dl]-ψ-1-p-nitrophenyl-2-acetamidopropane-1,3-diol is heated with 50 cc. of 8% hydrobromic acid for two hours and the solution evaporated to dryness in vacuo. The hydrobromide salt of [dl]-ψ-1-p-nitrophenyl-2-aminopropane-1,3-diol thus obtained is dissolved in water, the solution made alkaline with sodium hydroxide to pH 10 and extracted with ethyl acetate. The ethyl acetate is evaporated from the extract in vacuo to obtain the free base of [dl]-ψ-1-p-nitrophenyl-2-aminopropane-1,3-diol.

[e] 4 g. of [dl]-ψ-1-p-nitrophenyl-2-p'-nitrobenzamidopropane-1,3-diol is heated with a mixture consisting of 50 cc. of ethanol and 50 cc. of 10% hydrochloric acid for four hours. The reaction mixture is evaporated to dryness in vacuo, treated with 150 cc. of water and the solution made alkaline to pH 10 with sodium hydroxide. The mixture is extracted with ethyl acetate, the ethyl acetate extract washed with water, dried and evaporated to dryness in vacuo. The product thus obtained is [dl]-ψ-1-p-nitrophenyl-2-aminopropane-1,3-diol.

If desired the diacetate derivative of [dl]-ψ-1-p-nitrophenyl-2-p'-nitrobenzamidopropane-1,3-diol can be substituted for the free diol used in the above procedure.

[f] 5 g. of the triacetate of [dl]-ψ-1-p-nitrophenyl-2-aminopropane-1,3-diol is heated for four hours with 100 cc. of 10% sodium hydroxide solution. The reaction mixture is cooled, extracted with ethyl acetate, the ethyl acetate extracts washed with water, dried and evaporated to dryness in vacuo. The product thus obtained is [dl]-ψ-1-p-nitrophenyl-2-aminopropane-1,3-diol.

[g] 2 g. of [dl]-ψ-1-p-nitrophenyl-2-dichloroacetamidopropane-1,3-diol is heated under reflux with 50 cc. of 5% hydrochloric acid. After heating has been continued for about two and a half hours the reaction mixture is evaporated to dryness in vacuo and the residual [dl]-ψ-1-p-nitrophenyl-2-aminopropane-1,3-diol hydrochloride taken up in water. The solution is made alkaline to pH 10 with potassium hydroxide, extracted with ethyl acetate, the extracts dried and evaporated to dryness to obtain the free base of [dl]-ψ-1-p-nitrophenyl-2-aminopropane-1,3-diol.

If desired, the above hydrolysis can be carried out with 0.1 N sodium hydroxide solution at room temperature. In this case the reaction mixture is allowed to stand for about twenty hours, extracted with ethyl acetate and the desired product obtained by evaporation of the extract.

[h] 2 g. of [dl]-ψ-1-p-nitrophenyl-2-dichloroacetamidopropane-1,3-diol is heated for three hours with 50 cc. of 8% sodium hydroxide solution. The reaction mixture is cooled and extracted with ethyl acetate, the ethyl acetate extracts washed with water and the ethyl acetate distilled to obtain the desired [dl]-ψ-1-p-nitrophenyl-2-aminopropane-1,3-diol.

*Example 3*

[a] A mixture consisting of 5 g. of the triacetate of [l]-ψ-1-p-nitrophenyl-2-aminopropane-1,3-diol and 100 cc. of 5% hydrochloric acid is heated under reflux for three hours and then evaporated to dryness in vacuo. The residual hydrochloride salt of [l]-ψ-1-p-nitrophenyl-2-aminopropane-1,3-diol is taken up in water, the solution made alkaline to pH 10 with sodium hydroxide and extracted with ethyl acetate. The ethyl acetate is evaporated from the dried extract to obtain the free base of [l]-ψ-1-p-nitrophenyl-2-aminopropane-1,3-diol; M. P. 162° C. This product has the formula,

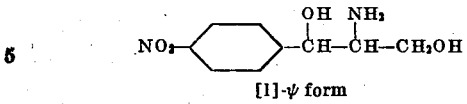

[l]-ψ form

[b] 4 g. of [l]-ψ-1-p-nitrophenyl-2-benzamido-3-benzoxypropane-1-ol is refluxed with 100 cc. of 5% sulfuric acid for four hours. The reaction mixture is evaporated to one-half volume in vacuo, the solution made alkaline to pH 10 with sodium hydroxide and extracted with ethyl acetate. The ethyl acetate extracts are dried and the ethyl acetate distilled to obtain the free base of [l]-ψ-1-p-nitrophenyl-2-aminopropane-1,3-diol.

[c] 4 g. of [l]-ψ-1-p-nitrophenyl-2-acetamidopropane-1,3-diol is heated under reflux with 35 cc. of 8% hydrochloric acid for one and a half hours. The reaction mixture is evaporated to dryness in vacuo to obtain the crystalline hydrochloride salt of [l]-ψ-1-p-nitrophenyl-2-aminopropane-1,3-diol. The free base can be obtained by dissolving the hydrochloride salt in water making the solution alkaline to pH 10, extracting with ethyl acetate and evaporating the extract to dryness.

[d] 4 g. of [l]-ψ-1-p-nitrophenyl-2-acetamidopropane-1,3-diol is heated under reflux with 100 cc. of 5% potassium hydroxide solution. After about three hours the reaction mixture is cooled, extracted with ethyl acetate, the extract washed with water, dried and the ethyl acetate distilled. The product thus obtained is [l]-ψ-1-p-nitrophenyl-2-aminopropane-1,3-diol.

[e] 3 g. of [l]-ψ-1-p-nitrophenyl-2-phenylacetamidopropane-1,3-diol is heated under reflux for three hours with 75 cc. of alcoholic 5% hydrobromic acid. The reaction mixture is evaporated to dryness in vacuo, treated with 75 cc. of water and the mixture made alkaline to pH 10 with sodium hydroxide solution. The solution is extracted with ethyl acetate, the extract washed with water, dried and the solvent distilled to obtain the desired [l]-ψ-1-p-nitrophenyl-2-aminopropane-1,3-diol.

[f] 3.5 g. of [l]-ψ-1-p-nitrophenyl-2-acetamido-3-acetoxypropane-1-ol is heated under reflux with 75 cc. of 5% hydrochloric acid for three hours. The reaction mixture is evaporated to dryness in vacuo to obtain the hydrochloride salt of [l]-ψ-1-p-nitrophenyl-2-aminopropane-1,3-diol.

If desired the corresponding [d]-ψ, [l]-reg. or [d]-reg. isomers can be substituted for the [l]-ψ isomers used in any of the above procedures. By utilizing the above procedures in this manner the corresponding [d]-ψ, [l]-reg., and [d]-reg. isomers of 1-p-nitrophenyl-2-aminopropane-1,3-diol can be obtained.

[g] 1 g. of [l]-ψ-1-p-nitrophenyl-2-aminopropane-1,3-diol dissolved in a small amount of isopropanol is added to a warm isopropanol solution containing one equivalent of oxalic acid monohydrate. The resulting mixture is evaporated to dryness in vacuo and the crystalline acid oxalate salt of [l]-ψ-1-p-nitrophenyl-2-aminopropane-1,3-diol purified by recrystallization from isopropanol.

0.5 g. of [l]-ψ-1-p-nitrophenyl-2-aminopropane-1,3-diol is added to an aqueous solution containing one equivalent of citric acid and the mixture evaporated to dryness in vacuo. The citrate salt of [l]-ψ-1-p-nitrophenyl-2-aminopropane- 1,3-diol thus obtained is purified by recrystallization from alcohol.

0.5 g. of [l]-ψ-1-p-nitrophenyl-2-aminopropane-1,3-diol is dissolved in a dilute solution of acetic acid and the resulting solution evaporated to dryness in vacuo to obtain the acetate salt of [l]-ψ-1-p-nitrophenyl-2-aminopropane-1,3-diol.

1 g. of [l]-ψ-1-p-nitrophenyl-2-aminopropane-1,3-diol is dissolved in a small amount of alcohol and the resulting solution is added to a methanol solution containing one equivalent of tartaric acid. The racemic tartrate salt of [l]-ψ-1-p-nitrophenyl-2-aminopropane-1,3-diol which crystallizes from the solution is collected and purified by recrystallization from methanol.

600 mg. of [dl]-reg.-1-p-nitrophenyl-2-aminopropane-1,3-diol is dissolved in a warm solution of 600 mg. of [d]-camphor sulfonic acid in 18 cc. of n-butanol. The solution is cooled, the crystals which separate collected and crystallized twice from n-butanol. The crystalline acid addition salt obtained in this manner is the [d]-camphor sulfonate of [d]-reg.-1-p-nitrophenyl-2-aminopropane-1,3-diol. If desired the [d]-camphor sulfonate of the corresponding [l]-reg. isomer can be obtained from the filtrates.

1 g. of [dl]-ψ-1-p-nitrophenyl-2-aminopropane-1,3-diol is dissolved in a small amount of water and treated with an aqueous solution containing an equivalent amount of [d]-tartaric acid. The solution is evaporated to dryness in vacuo and the residue fractionally crystallized from the minimum amount of hot methanol. The first isomer to separate from the solution in crystalline form is the [d]-tartaric acid salt of [l]-ψ-1-p-nitrophenyl-2-aminopropane-1,3-diol; M. P. 198–200° C. The [d]-tartaric acid salt of [d]-ψ-1-p-nitrophenyl-2-aminopropane-1,3-diol is recovered from the filtrates after removal of the salt of the [l] isomer.

2 g. of [dl]-ψ-1-p-nitrophenyl-2-aminopropane-1,3-diol and an equal amount of [+][d]-mandelic acid is dissolved in 80 cc. of boiling absolute ethanol and the solution allowed to cool slowly. The [+][d]-mandelate salt of [l]-ψ-1-p-nitrophenyl-2-aminopropane-1,3-diol which separates from the solution first is collected and purified by recrystallization from absolute ethanol. The [+][d]-mandelate salt of the [d]-ψ isomer can be recovered from the filtrates.

5 g. of [dl]-reg.-1-p-nitrophenyl-2-aminopropane-1,3-diol is dissolved in water and treated with an equivalent amount of [d]-tartaric acid. The reaction mixture is evaporated to dryness and the mixture of the [d]-tartaric acid salt of the [d]- and [l]-forms of reg.-1-p-nitrophenyl-2-aminopropane-1,3-diol separted by fractional crystallization.

*Example 4*

[a] 5 g. of the triacetate of [dl]-ψ-1-o-methyl-p-nitrophenyl-2-aminopropane-1,3-diol is heated with 250 cc. of 5% hydrochloric acid for about three hours and then the reaction mixture evaporated to dryness in vacuo. The residue which consists of [dl]-ψ-1-o-methyl-p-nitrophenyl-2-aminopropane-1,3-diol hydrochloride of formula,

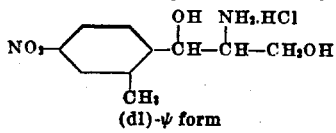

(dl)-ψ form is taken up in water, the solution made alkaline to pH 10 with sodium hydroxide and then extracted with several portions of ethyl acetate.

The ethyl acetate extracts are dried and the ethyl acetate distilled to obtain the free base of [dl]-ψ-1-o-methyl-p-nitrophenyl-2-aminopropane-1,3-diol which has the formula,

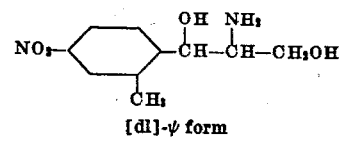

[dl]-ψ form

[b] 4 g. of the triacetate of [dl]-reg.-1-o-methyl-p-nitrophenyl-2-aminopropane-1,3-diol is heated with about 200 cc. of 5% hydrochloric or hydrobromic acid for about 3 to 4 hours and the reaction mixture evaporated to dryness in vacuo. The residue which consists of the corresponding hydrohalide salt of [dl]-reg.-1-o-methyl-p-nitrophenyl-2-aminopropane-1,3-diol is taken up in water, the solution made alkaline to pH 10 with potassium hydroxide and the solution extracted with ethyl acetate. The combined extracts are dried and the ethyl acetate removed by distillation in vacuo to obtain the desired [dl]-reg.-1-o-methyl-p-nitrophenyl-2-aminopropane-1,3-diol of formula,

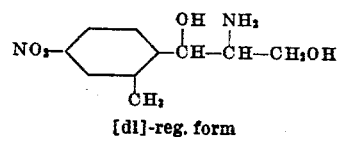

[dl]-reg. form

[c] 5 g. of [dl]-ψ-1-o-methyl-p-nitrophenyl-2-phenylacetamido-3-phenyl acetoxypropane-1-ol is heated under reflux for four hours with 100 cc. of 10% sodium hydroxide solution. The reaction mixture is cooled, exhaustively extracted with ethyl acetate, the ethyl acetate extracts washed with water, dried and the ethyl acetate distilled. The product thus obtained is [dl]-ψ-1-o-methyl-p-nitrophenyl-2-aminopropane-1,3-diol.

[d] 3 g. of [dl]-ψ-1-o-methyl-p-nitrophenyl-2-propionamido-3-propionyloxypropane-1-ol is heated under reflux for four hours with 50 cc. of 10% potassium hydroxide solution. The reaction mixture is cooled, extracted with ethyl acetate, the extracts washed with water, dried and the ethyl acetate distilled. The product thus obtained is [dl]-ψ-1-o-methyl-p-nitrophenyl-2-aminopropane-1,3-diol.

[e] 4 g. of [dl]-ψ-1-o-methyl-p-nitrophenyl-2-aminopropane-1,3-diol is dissolved in a small amount of water and added to an aqueous solution containing an equivalent amount of [d]-tartaric acid. The solution is evaporated to dryness in vacuo and the residue fractionally crystallized from hot methanol. The first isomer to separate from the solution is the [d]-tartaric acid salt of [l]-ψ-1-o-methyl-p-nitrophenyl-2-aminopropane-1,3-diol. After removal of the [d] acid salt of the [l] isomer the corresponding [d] acid salt of the [d]-ψ isomeric diol is recovered from the combined filtrates.

3 g. of [dl]-reg.-1-o-methyl-p-nitrophenyl-2-aminopropane-1,3-diol is dissolved in water and the solution treated with an aqueous solution containing one equivalent of [d]-tartaric acid. The aqueous reaction mixture is evaporated to dryness in vacuo and the optical isomers separated by fractional crystallization of their salts from methanol. The [d]-tartaric acid salt of [d]-reg.-1-o-methyl-p-nitrophenyl-2-aminopropane-1,3-diol separates first from the mixture while the [d]-tartaric acid salt of the [l]-reg. isomer is recovered from the filtrates.

Example 5

[a] 4 g. of the triacetate of [dl]-ψ-1-m-methoxy-p-nitrophenyl-2-aminopropane-1,3-diol is refluxed with 200 cc. of 5% hydrochloric acid for three hours and then the reaction mixture evaporated to dryness in vacuo. The residual [dl]-ψ-1-m-methoxy-p-nitrophenyl-2-aminopropane-1,3-diol hydrochloride is taken up in water, the solution made alkaline to pH 10 with sodium hydroxide and then extracted with ethyl acetate. The combined extracts are dried and the ethyl acetate removed by distillation under reduced pressure to obtain the desired [dl]-ψ-1-m-methoxy-p-nitrophenyl-2-aminopropane-1,3-diol. This product's formula is,

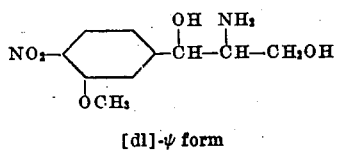

[dl]-ψ form

[b] 6 g. of the triacetate of [dl]-reg.-1-m-methoxy-p-nitrophenyl-2-aminopropane-1,3-diol is hydrolyzed by refluxing with 300 cc. of 5% hydrochloric acid for three hours. The reaction mixture is evaporated to dryness in vacuo and the residue which consists of the hydrochloride of the desired amino diol taken up in water. The solution is made alkaline to pH 10 with sodium hydroxide solution, extracted with ethyl acetate and the solvent distilled from the extracts to obtain the desired free base of [dl]-reg.-1-m-methoxy-p-nitrophenyl-2-aminopropane-1,3-diol. Its formula is,

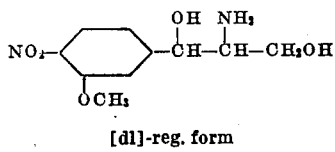

[dl]-reg. form

[c] 4 g. of [dl]-ψ-1-m-methoxy-p-nitrophenyl-2-p'-methylbenzamido-3-p'-methylbenzoxypropane-1-ol is refluxed with 75 cc. of 5% hydrochloric acid for four hours. The reaction mixture is evaporated to about one-half volume, the solution made alkaline to pH 10 with potassium hydroxide and extracted with ethyl acetate. The ethyl acetate extracts are washed with water, dried, and the ethyl acetate distilled to obtain the desired [dl]-ψ-1-m-methoxy-p-nitrophenyl-2-aminopropane-1,3-diol.

0.5 g. of [dl]-ψ-1-m-methoxy-p-nitrophenyl-2-aminopropane-1,3-diol dissolved in a small amount of methanol is added to a methanol solution containing one equivalent of salicylic acid. Evaporation of the solution to dryness in vacuo yields the salicylate salt of [dl]-ψ-1-m-methoxy-p-nitrophenyl-2-aminopropane-1,3-diol.

Example 6

[a] 6 g. of the triacetate of [dl]-reg.-1-[2'-nitro-4',5'-dimethylphenyl]-2-aminopropane-1,3-diol is refluxed for three or four hours with about 300 cc. of 5% hydrochloric acid and then the reaction mixture evaporated to dryness in vacuo. The residue is dissolved in water, the solution made alkaline to about pH 12 with sodium hydroxide and extracted with ethyl acetate. The ethyl acetate is distilled from the extracts in vacuo to obtain the desired [dl]-reg.-1-[2'-nitro-4',5'-dimethylphenyl]-2-aminopropane-1,3-diol of formula,

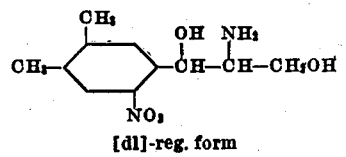

[dl]-reg. form

[b] 5 g. of [dl]-ψ-1-[2'-nitro-4',5'-dimethylphenyl]-2-acetamidopropane-1,3-diol is heated under reflux for three hours with 100 cc. of 5% hydrobromic acid and then the reaction mixture evaporated to dryness in vacuo. The residual hydrobromide salt is taken up in water, the solution made alkaline to pH 10 with potassium hydroxide and extracted with ethyl acetate. The extracts are washed with water, dried and the ethyl acetate distilled to obtain the desired [dl]-ψ-1-[2'-nitro-4',5'-dimethylphenyl]-2-aminopropane-1,3-diol of formula,

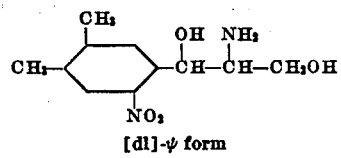

[dl]-ψ form

If desired the hydrolysis of the above procedure can be carried out using 5% potassium hydroxide solution.

Example 7

[a] 5 g. of the triacetate of [dl]-ψ-2-amino-3-p-nitrophenylbutane-1,3-diol is refluxed with 250 cc. of 5% hydrobromic acid for about two hours and then the reaction mixture evaporated to dryness in vacuo. The residue is taken up in water, the solution made alkaline with sodium hydroxide and extracted with ethyl acetate. The ethyl acetate is distilled from the combined extracts to obtain the free base of [dl]-ψ-2-amino-3-p-nitrophenylbutane-1,3-diol of formula,

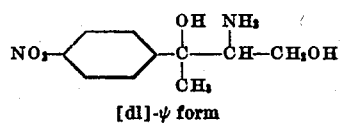

[dl]-ψ form

[b] 3 g. of [l]-ψ-2-succinamido-3-p-nitrophenyl-1-β-carboxy-propionyloxybutane-3-ol is refluxed with 50 cc. of 5% hydrochloric acid for three hours. The reaction mixture is cooled, made alkaline with sodium hydroxide solution and extracted with ethyl acetate. The extracts are washed with water, dried and the ethyl acetate distilled to obtain the desired [l]-ψ-2-amino-3-p-nitrophenylbutane-1,3-diol of formula,

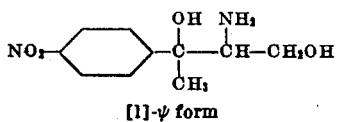

[l]-ψ form

Example 8

[a] 5 g. of the unresolved triacetate of 1-[2'-chloro-5'-nitrophenyl]-2-aminopropane-1,3-diol is heated with 250 cc. of 5% hydrochloric acid for about three hours and then the reaction mixture evaporated to dryness in vacuo. The residue which consists of 1-[2'-chloro-5'-nitrophenyl]-2-aminopropane-1,3-diol hydrochloride is taken up in water, the solution made alkaline to about pH 9 or 10 with sodium hydroxide and extracted with ethyl acetate. The extracts are dried and the ethyl acetate distilled in vacuo to obtain the free base of 1-[2'-chloro-5'-nitrophenyl]-2-aminopropane-1,3-diol. This product has the formula,

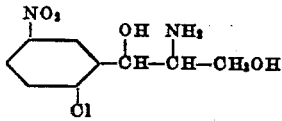

Unresolved

Some further examples of the acylated amino diols which can be used as starting materials in the practice of the invention are:

[dl]-ψ-1-p-nitrophenyl - 2 - β,β - dimethylacrylamidopropane-1,3-diol

[l]-ψ-1-p - nitrophenyl - 2 - lactamidopropane-1,3-diol

[dl]-reg.-1-p-nitrophenyl - 2 - cyanoacetamidopropane-1,3-diol

[d]-ψ-1-p-nitrophenyl-2-methoxyacetamido-1,3-dimethoxyacetoxypropane

[dl]-ψ-1-p-nitrophenyl - 2-p'-methylbenzamido-1,3-di-p'-methylbenzoyloxypropane

[l]-ψ-1-p-nitrophenyl - 2 - [3',4' - dichlorobenzamido]-propane-1,3-diol

[d]-reg.-1-p-nitrophenyl- 2 -p'-nitrobenzamidopropane-1,3-diol

[dl]-ψ-1-p-nitrophenyl-2-furamido-1,3-difuroyloxypropane

[l]-ψ-1-p-nitrophenyl - 2 - [3'-pyridinamidopropane-1,3-diol

[dl]-ψ-1-p-nitrophenyl - 2 - [α - acetoxypropionamido]-1,3-diacetoxypropane

In the foregoing examples we have employed a new class of acylated amino diols as starting materials. These starting materials can be prepared in a number of different ways. One of the general methods which can be used to prepare these acylated amino diols is that represented by the following diagram.

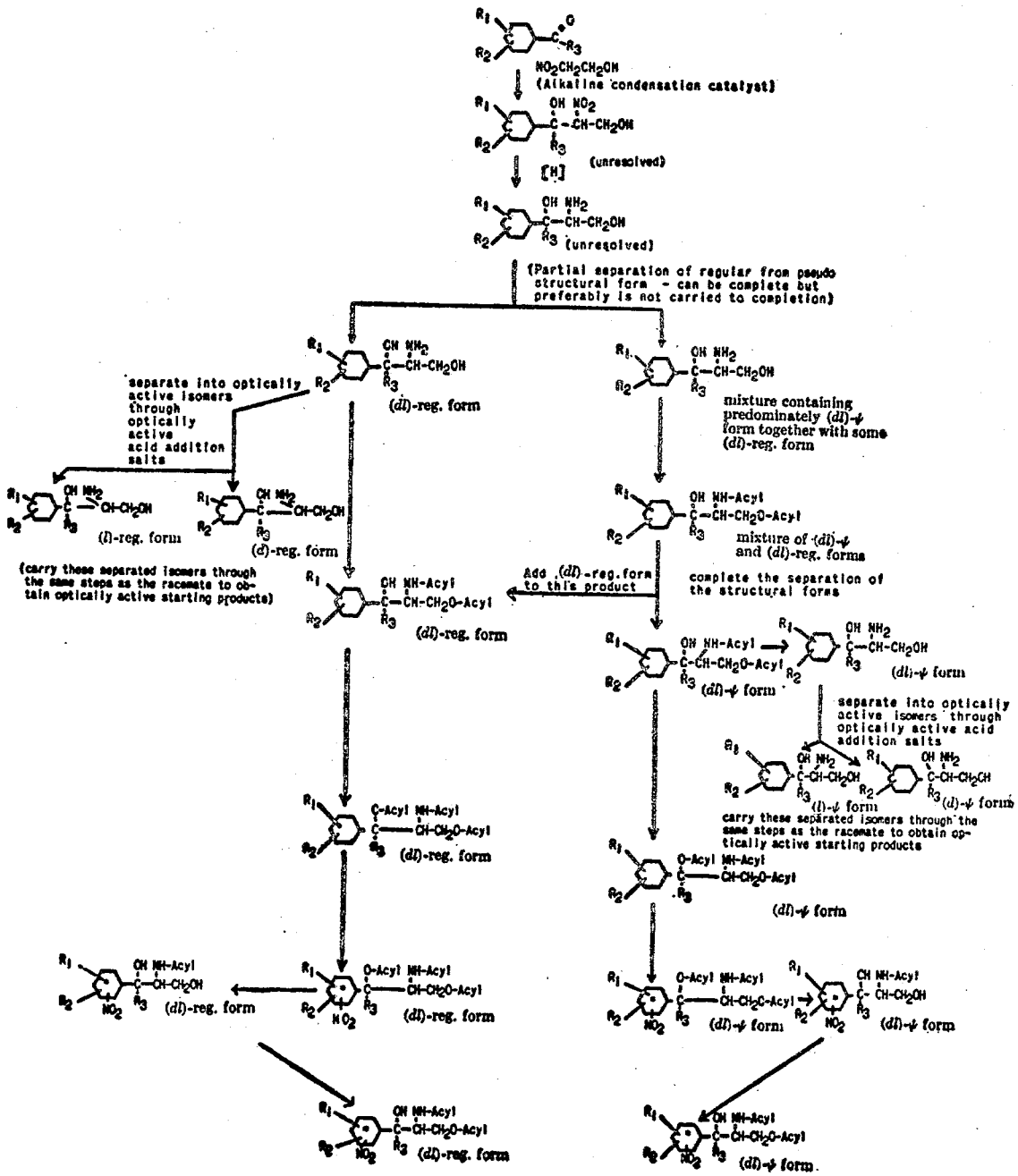

where $R_1$, $R_2$ and $R_3$ have the same significance as given above. The starting materials used in the practice of the invention are marked with an asterisk in the phenyl ring. The preparation of the unresolved starting materials has not been shown on the above diagram but these products may be prepared by the indicated processes by omitting the steps of separating the structural and optical isomers. The optically active starting materials can be prepared, as indicated on the diagram, from the individual optical isomers of the un-nitrated amino diols by following the procedures utilized for the preparation of the racemic starting products.

Many of the above processes and products depicted in the above diagram and disclosed but not claimed herein are described and claimed in our copending applications Serial Nos. 76,172; 76,173; 76,174; 76,175; 76,176; 76,177 and 76,180, all filed February 12, 1949 on even date herewith as continuations-in-part of our parent application Serial No. 15,264 (now Patent No. 2,483,884), and in our United States Patents Nos. 2,483,884 and 2,483,885, all issued October 4, 1949.

The following examples serve to illustrate the application of this general method to the preparation of some of the specific starting materials used in the foregoing examples.

*Example 9*

1.1 g. of sodium is dissolved in 20 cc. of methanol and the resulting solution added to a solution of 5 g. of benzaldehyde and 4.5 g. of β-nitroethanol in 20 cc. of methanol. After standing at room temperature for a short time the gel which forms on the mixing of the reactants changes to a white insoluble powder. The precipitate is collected, washed with methanol and ether and then dried. The product thus produced is the sodium salt of 1-phenyl-2-nitropropane-1,3-diol. If desired, the free nitro-diol having the formula,

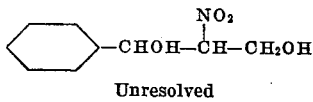

Unresolved can be obtained by acidification of the salt.

20 g. of the sodium salt of 1-phenyl-2-nitropropane-1,3-diol [prepared by the above method] is dissolved in 200 cc. of glacial acetic acid. 0.75 g. of palladium oxide hydrogenation catalyst is added and the mixture shaken with hydrogen under three atmospheres pressure for about twelve hours. The catalyst is removed by filtration, the filtrate concentrated to about one-tenth volume in vacuo and diluted with five volumes of water. The solution is extracted with one volume of ethyl acetate or ether and the extract discarded. The aqueous phase is made alkaline to pH 12 with strong sodium hydroxide solution and extracted with five 100 cc. portions of ethyl acetate. The combined extracts are dried, the ethyl acetate evaporated and the residue recrystallized from chloroform. The white crystalline product thus obtained is [dl]-reg.-1-phenyl-2-aminopropane-1,3-diol [M. P. 103-4° C.] of formula,

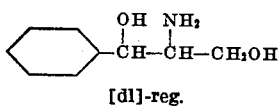

[dl]-reg.

The chloroform filtrate from the crystallization of the [dl]-reg.-1-phenyl-2-aminopropane-1,3-diol is evaporated to dryness and the residue heated with an excess of acetic anhydride at 70° C. for fifteen minutes. The reaction mixture is evaporated to dryness in vacuo and the residue recrystallized from ethanol. This white crystalline product which melts at 167-8° C. is [dl]-ψ-1-phenyl-2-acetamido-3-acetoxypropane-1-ol. It can be represented by the following formula,

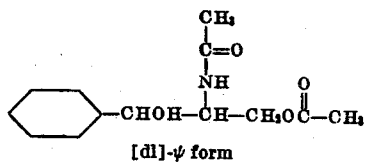

[dl]-ψ form 2 g. of [dl]-ψ-1-phenyl-2-acetamido-3-acetoxypropane-1-ol is added to a mixture composed of 4 cc. of acetic anhydride and 4 cc. of dry pyridine and the resulting mixture heated at 100° C. for about one-half hour. The reaction mixture is evaporated in vacuo and the residue recrystallized from methanol to obtain the triacetate of [dl]-ψ-1-phenyl-2-aminopropane-1,3-diol melting at 79° C. Its formula is:

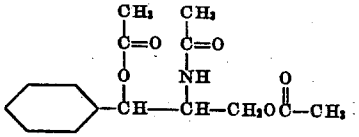

[dl]-ψ form 2 g. of the triacetate of [dl]-ψ-1-phenyl-2-aminopropane-1,3-diol is added in small portions to a mixture composed of 2.5 cc. of concentrated nitric acid and 2.5 cc. of concentrated sulfuric acid. The temperature of the nitrating mixture is maintained at about 0° C. and the reaction continued until solution of the aminodiol derivative is complete. The reaction mixture is poured onto 250 g. of ice and the resulting solution extracted with several portions of ethyl acetate. After washing with sodium carbonate solution the ethyl acetate is distilled from the combined extracts in vacuo and the residual triacetate of [dl]-ψ-1-p-nitrophenyl-2-aminopropane-1,3-diol purified by recrystallization from ethanol. This product which melts at 145° C. has the formula,

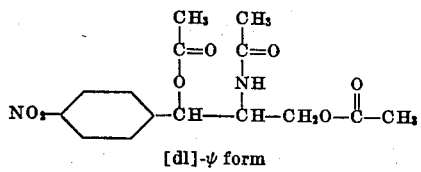

[dl]-ψ form 368 mg. of the triacetate of [dl]-ψ-1-p-nitrophenyl-2-aminopropane-1,3-diol is dissolved in 50 cc. of acetone. 50 cc. of 0.1 N sodium hydroxide solution is added and the mixture allowed to stand at 0° C. for one hour. The solution is neutralized with 0.1 N sulfuric acid, evaporated to dryness and the residue extracted with ethyl acetate. The extract is filtered, the ethyl acetate distilled off in vacuo and the residue recrystallized from ethanol to obtain the desired [dl]-ψ-1-p-nitrophenyl-2-acetamidopropane-1,3-diol; M. P. 166.5-167.5° C. This product has the formula,

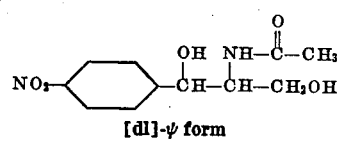

[dl]-ψ form 3 g. of [dl]-ψ-1-p-nitrophenyl-2-acetamidopropane-1,3-diol is heated with 10 cc. of acetic anhydride at 70° C. for fifteen minutes and then the reaction mixture evaporated to dryness in vacuo. The residue is recrystallized from ethanol to obtain the desired [dl]-ψ-1-p-nitrophenyl-2-acetamido-3-acetoxypropane-1-ol of formula,

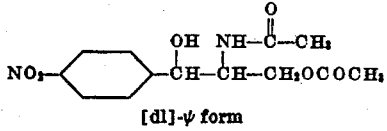

[dl]-ψ form

*Example 10*

4 g. of [dl]-ψ-1-phenyl-2-acetamido-3-acetoxypropane-1-ol in 25 cc. of 3 N hydrochloric acid is refluxed for about three hours and the reaction mixture evaporated to dryness. The residual hydrochloride salt is taken up in a small amount of water, the solution made alkaline with sodium hydroxide and extracted with ethyl acetate. After drying, the ethyl acetate is evaporated from the extracts in vacuo to obtain the free base of [dl]-ψ-1-phenyl-2-aminopropane-1,3-diol; M. P. 86-7° C. This product has the formula,

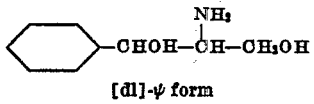

[dl]-ψ form

The free base of [dl]-ψ-1-phenyl-2-aminopropane-1,3-diol obtained above is dissolved in 60 cc. of warm n-butanol containing 5 g. of [d]-camphor sulfonic acid and the mixture cooled. The solid which separates is collected, recrystallized twice from n-butanol and dissolved in a small amount of water containing an excess of sodium hydroxide. The solution is extracted with ethyl acetate, the ethyl acetate extracts dried and the solvent distilled in vacuo. The residue which consists of [l]-ψ-1-phenyl-2-aminopropane-1,3-diol has the formula,

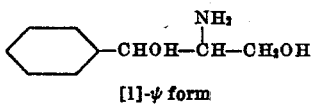

[l]-ψ form 5 g. of [l]-ψ-1-phenyl-2-aminopropane-1,3-diol is heated under reflux with 50 cc. of acetic anhydride for three hours. The reaction mixture is evaporated to dryness in vacuo and the residue recrystallized from methanol to obtain the desired triacetate of [l]-ψ-1-phenyl-2-aminopropane-1,3-diol of formula,

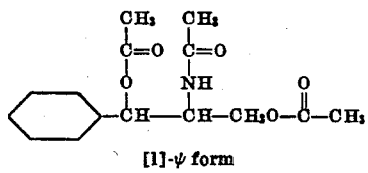

[l]-ψ form 4 g. of the triacetate of [l]-ψ-1-phenyl-2-aminopropane-1,3-diol is added with stirring to a mixture consisting of 5 cc. of concentrated nitric acid and 5 cc. of concentrated sulfuric acid keeping the temperature at 0° C. The reaction mixture is stirred until solution is complete, poured into 400 g. of ice water and extracted with ethyl acetate. The ethyl acetate extract is washed with water, dried and the ethyl acetate distilled in vacuo. The product thus obtained is the triacetate of [l]-ψ-1-p-nitrophenyl-2-aminopropane-1,3-diol which has the formula,

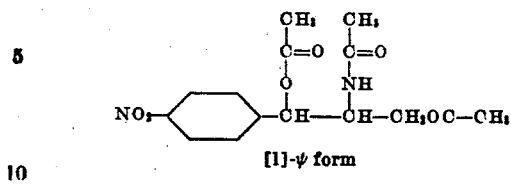

[l]-ψ form and which may be purified by recrystallization from ether-low petroleum ether; M. P. 109–11° C.

A solution of 350 mg. of the triacetyl derivative of [l]-ψ-1-p-nitrophenyl-2-aminopropane-1,3-diol in 17 cc. of acetone is added to 18 cc. of N/10 sodium hydroxide solution at 0° C. After one hour at 0° C. the excess alkali is exactly neutralized with N/10 hydrochloric acid and the solution evaporated to dryness in vacuo. The residue is warmed with ethylene dichloride, filtered to remove salt and the filtrate concentrated to a small volume. Addition of petroleum ether induces crystallization of N-acetyl-[l]-ψ-1-p-nitrophenyl-2-aminopropane-1,3-diol; M. P. 125–6° C. It has the formula:

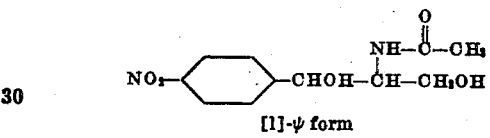

[l]-ψ form 1 g. of [l]-ψ-1-p-nitrophenyl-2-acetamidopropane-1,3-diol is heated with 3 cc. of acetic anhydride at 100° C. for fifteen minutes. The reaction mixture is evaporated to dryness in vacuo at a low temperature and the residual [l]-ψ-1-p-nitrophenyl-2-acetamido-3-acetoxypropane-1-ol purified by recrystallization from methanol. Its formula is,

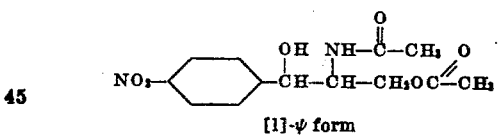

[l]-ψ form

By substituting the corresponding [d]-ψ isomer for the [l]-ψ-1-phenyl-2-aminopropane-1,3-diol used in the above procedures one obtains the corresponding [d]-ψ starting materials. The optically active starting materials of the regular series can be prepared by substituting [dl]-reg.-1-phenyl-2-aminopropane-1,3-diol for the corresponding [dl]-ψ isomer in the above procedures.

*Example 11*

10 g. of [dl]-reg.-1-phenyl-2-aminopropane-1,3-diol is heated with a mixture consisting of 20 cc. of pyridine and 20 cc. of acetic anhydride for one-half hour at 100° C. The reaction mixture is evaporated to dryness in vacuo to obtain the desired triacetate of [dl]-reg.-1-phenyl-2-amino-propane-1,3-diol; M. P. 115–16° C. This same compound can also be obtained by first diacylating the [dl]-reg.-1-phenyl-2-aminopropane-1,3-diol on the amino and terminal hydroxyl groups with acetic anhydride and then subsequently O-acylating the [dl]-reg.-1-phenyl-2-acetamido-3-acetoxypropane-1-ol so obtained with acetic anhydride and pyridine.

10 g. of the triacetate of [dl]-reg.-1-phenyl-2-aminopropane-1,3-diol is added in small portions to a mixture composed of 12.5 cc. of concentrated nitric acid and 12.5 cc. of concentrated sulfuric acid 0° C. After the addition has been completed the temperature is maintained at 0° C. until solution is complete and then the reaction mixture poured onto 1250 g. of ice. The solution is extracted with several portions of ethyl acetate, the ethyl acetate extracts washed with dilute sodium carbonate solution and the ethyl acetate removed by distillation in vacuo. The residue which consists of the triacetate of [dl]-reg.-1-p-nitrophenyl-2-aminopropane-1,3-diol is purified by recrystallization from ethanol; M. P. 157–8° C.

4 g. of the triacetate of [dl]-reg.-1-p-nitrophenyl-2-aminopropane-1,3-diol is added to a mixture consisting of 200 cc. of N/10 sodium hydroxide solution and 200 cc. of acetone. The resulting mixture is stirred for one hour, the excess alkali neutralized with sulfuric acid and the solution evaporated to dryness in vacuo. The residue is extracted with ethyl acetate, the ethyl acetate extract filtered to remove the inorganic salt and evaporated to dryness to obtain the desired [dl]-reg.-1-p-nitrophenyl-2-acetamidopropane-1,3-diol [M. P. 195–6° C.] of formula,

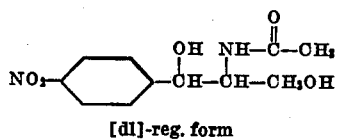

[dl]-reg. form

[dl] - reg. - 1 - p - nitrophenyl - 2 - acetamido-3-acetoxypropane-1-ol can be prepared by heating [dl]-reg.-1-p-nitrophenyl-2-acetamidopropane-1,3-diol with an excess of acetic anhydride at 70° C. for a short time. The reaction mixture is evaporated to dryness in vacuo and the product purified by recrystallization from ethanol. Its formua is,

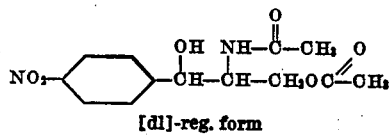

[dl]-reg. form

*Example 12*

1.7 g. of [dl]-reg.-1-phenyl-2-aminopropane-1,3-diol is treated with 1.6 g. of methyl dichloroacetate and the mixture heated at 100° C. for one and a quarter hours. The residue is washed with two 20 cc. portions of petroleum ether and the insoluble product collected. Recrystallization from ethyl acetate yields the desired [dl]-reg. - 1 - phenyl - 2 - dichloroacetamidopropane-1,3-diol in pure form; M. P. 158–9° C. This product's formula is:

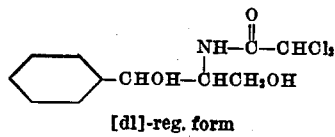

[dl]-reg. form 500 mg. of [dl]-reg.-1-phenyl-2-dichloroacetamidopropane-1,3-diol is added to a solution consisting of 1 cc. of pyridine and 1 cc. of acetic anhydride and the resulting reaction mixture heated at 100° C. for one-half hour. The reaction mixture is evaporated to dryness under reduced pressure and the residue taken up in and crystallized from methanol. Recrystallization from methanol produces the pure diacetate of [dl] - reg. - 1 - phenyl - 2 - dichloroacetamido-propane-1,3-diol [M. P. 94° C.] having the formula,

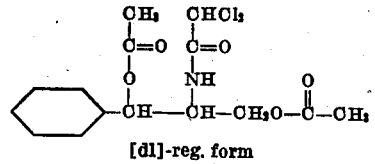

[dl]-reg. form 200 mg. of the diacetate of [dl]-reg.-1-phenyl-2-dichloroacetamidopropane-1,3-diol is added to a mixture consisting of 0.25 cc. of concentrated nitric acid and 0.25 cc. of concentrated sulfuric acid at 0° C. The reaction mixture is stirred until solution is complete, poured onto 25 g. of ice and the mixture extracted with ethyl acetate. The ethyl acetate extracts are evaporated under reduced pressure and the diacetate of [dl]-reg.-1 - p - nitrophenyl - 2 - dichloroacetamidopropane-1,3-diol so produced purified by recrystallization from ethanol; M. P. 134° C. This compound has the following formula,

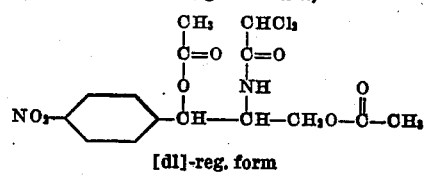

[dl]-reg. form 500 mg. of the diacetate of [dl]-reg.-1-p-nitrophenyl-2-dichloroacetamidopropane-1,3-diol is dissolved in a mixture consisting of 25 cc. of acetone and an equal volume of 0.2 N sodium hydroxide solution at 0° C. and the mixture allowed to stand for one hour. The reaction mixture is neutralized with hydrochloric acid and evaporated under reduced pressure to dryness. The residue is extracted with several portions of hot ethylene dichloride, the extracts concentrated and then cooled to obtain the crystalline [dl]-reg.-1-p-nitrophenyl-2-dichloroacetamidopropane- 1,3-diol; M. P. 171° C. The formula of this compound is:

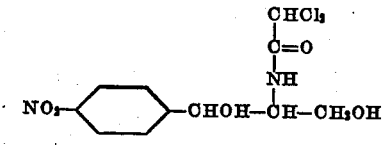

[dl]-reg. form

*Example 13*

2.2 g. of sodium dissolved in 40 cc. of methanol is added to a solution of 12 g. of o-methyl benzaldehyde and 9 g. of β-nitroethanol in 40 cc. of methanol. The reaction mixture is allowed to stand at room temperature for a short time and then the whie insoluble sodium salt of 1-o-methylphenyl-2-nitropropane-1,3-diol removed by filtration, washed with ether and dried. Acidification of this sodium salt produces the corresponding free nitro compound, 1-o-methylphenyl-2-nitropropane-1,3-diol, which has the formula,

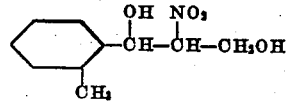

Unresolved 18 g. of the sodium salt of 1-o-methylphenyl-2-nitropropane-1,3-diol is dissolved in 175 cc. of glacial acetic acid, 0.75 g. of palladium oxide hydrogenation catalyst added and the mixture hydrogenated under three atmospheres pressure of hydrogen for about twelve hours. The catalyst is removed by filtration, the filtrate concentrated to a small volume in vacuo and then the residue diluted with five volumes of water. The solution is extracted with one volume of ethyl acetate or ether and the extract discarded. The aqueous phase is made alkaline to pH 12 with strong sodium hydroxide solution and extracted with five volumes of ethyl acetate. The ethyl acetate extracts are combined, dried and the ethyl acetate evaporated in vacuo. The residue which consists of a mixture of the [dl]-regular and [dl]-pseudo 1-o-methylphenyl-2-aminopropane-1,3-diol is taken up in and crystallized from chloroform to obtain the [dl]-reg.-1-o-methylphenyl-2-aminopropane-1,3-diol in crystalline form. Its formula is:

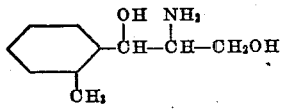

[dl]-reg. form

The chloroform filtrate from which the [dl]-reg.-1-o-methylphenyl-2-aminopropane-1,3-diol has been removed is evaporated in vacuo to obtain the crude [dl]-ψ-1-o-methylphenyl-2-aminopropane-1,3-diol. If desired, the crude [dl]-pseudo product can be converted directly to the triacetate by treatment with acetic anhydride and pyridine but we have found it preferable to purify this product through an acyl derivative such as the N-mono acetate or the N, 3-O-diacetate before proceeding further in the synthesis of our new antibiotics. This purification may be carried out as follows:

1. The crude [dl]-ψ-1-o-methylphenyl-2-aminopropane-1,3-diol is treated with an excess of acetyl chloride at about room temperature in a solvent of dry benzene. When a considerable amount of the hydrochloride salt of [dl]-ψ-o-methylphenyl-2-aminopropane-1,3-diol has separated from the solution the reaction is stopped by the addition of 300 cc. of water. After thorough mixing the aqueous solution is removed and saved for recovery of the unacetylated amino diol. The benzene solution is washed with dilute sodium bicarbonate solution and then dried. The benzene is removed by distillation in vacuo and the crude [dl]-ψ-1-o-methylphenyl-2-acetamidopropane-1,3-diol taken up in alcohol and purified by recrystallization from alcohol. The formula of this product is:

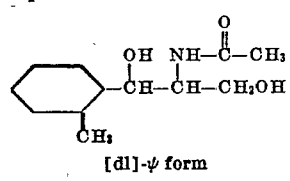

[dl]-ψ form

2. An alternative method for purifying the crude [dl]-ψ-amino diol is as follows:

The crude [dl]-ψ-1-o-methylphenyl-2-aminopropane-1,3-diol is heated with an excess of acetic anhydride at about 70 to 80° C. for fifteen minutes and then the reaction mixture evaporated in vacuo. The residue which consists of [dl]-ψ-1-o-methylphenyl-2-acetamido-3-acetoxypropane-1-ol has the formula,

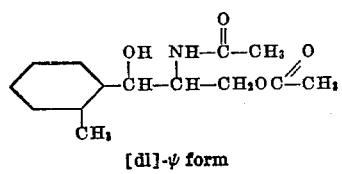

[dl]-ψ form and is purified by recrystallization from ethanol.

5 g. of either [dl]-ψ-1-o-methylphenyl-2-acetamidopropane-1,3-diol or [dl]-ψ-1-o-methylphenyl-2-acetamido-3-acetoxypropane-1-ol is added to a mixture consisting of 10 cc. of acetic anhydride and 10 cc. of pyridine and the resulting mixture heated at 100° C. for about one-half hour. The reaction mixture is concentrated to dryness in vacuo and the residual triacetate of [dl]-ψ-1-o-methylphenyl-2-aminopropane-1,3-diol recrystallized from methanol. The formula of this product is:

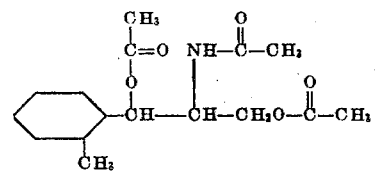

[dl]-ψ form 6 g. of triacetate of [dl]-ψ-1-o-methylphenyl-2-aminopropane-1,3-diol is added in small portions to a nitrating mixture composed of 7.5 cc. of concentrated nitric and 7.5 cc. of concentrated sulfuric acid while keeping the temperature at about 0° C. The reaction mixture is stirred until solution is complete and then poured onto 750 g. of ice. The solution is extracted with several portions of ethyl acetate, the extracts washed with sodium carbonate solution and the ethyl acetate distilled. The residue which consists principally of the triacetate of [dl]-ψ-1-o-methyl-p-nitrophenyl-2-aminopropane-1,3-diol of formula,

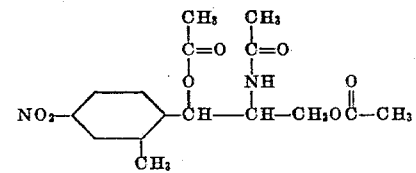

[dl]-ψ form can be purified by recrystallization from ethanol. A mixture consisting of 4 g. of [dl]-ψ-1-o-methyl-p-nitrophenyl-2-aminopropane-1,3-diol triacetate, 200 cc. of 0.1 N sodium hydroxide solution and 200 cc. of acetone is allowed to stand for one hour at room temperature and then the excess alkali neutralized with sulfuric acid. The reaction mixture is evaporated to a small volume, cooled and extracted with ethyl acetate. The ethyl acetate extracts are washed with water, dried and the ethyl acetate distilled in vacuo to obtain the desired [dl]-ψ-1-o-methyl-p-nitrophenyl-2-acetamidopropane-1,3-diol of formula,

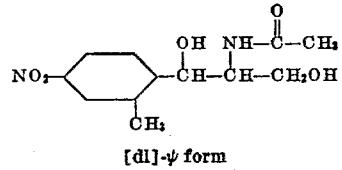

[dl]-ψ form

If desired this product can be purified by recrystallization from ethyl acetate.

3 g. of [dl]-ψ-1-o-methyl-p-nitrophenyl-2-acetamidopropane-1,3-diol is heated with 6 cc. of acetic anhydride at 70° C. for fifteen minutes. The reaction mixture is evaporated to dryness at a low temperature in vacuo and the residue recrystallized from ethanol to obtain the desired

[dl]-ψ-1-o-methyl-p-nitrophenyl-2-acetamido-3-acetoxypropane-1-ol of formula,

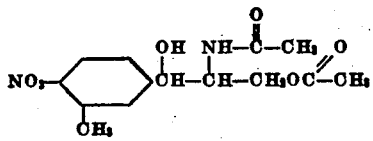

[dl]-ψ form

Example 14

The starting materials having as the root of their formulae the structure

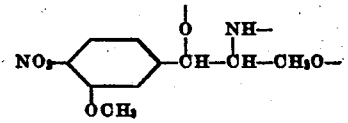

can be obtained by starting with m-methoxybenzaldehyde and β-nitroethanol and applying the procedures described in Examples 9, 10 and 11.

Example 15

The starting materials which have as the root of their formulae the structure

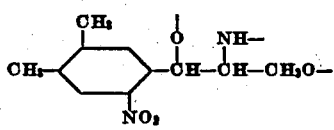

can be prepared by starting with 3,4-dimethylbenzaldehyde and β-nitroethanol and following the procedures described in Examples 9, 10 and 11.

Example 16

The compounds used as starting materials in the preparation of the amino diols having the general formula,

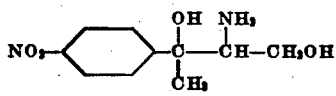

are prepared by starting with acetophenone and β-nitroethanol and following the procedures described in Examples 9, 10 and 11.

Example 17

The products used as starting materials having as the root of their formulae the structure

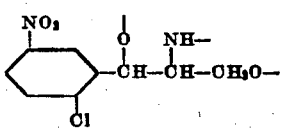

can be prepared from o-chlorobenzaldehyde and β-nitroethanol using the procedures described in Examples 9, 10 and 11. However, the reduction of the 1-o-chlorophenyl-2-nitropropane-1,3-diol intermediate is preferably carried out by the use of stannous acetate or chloride in acetic acid rather than by the use of the catalytic means shown in the aforementioned examples.

What we claim is:

1. A compound of the formula,

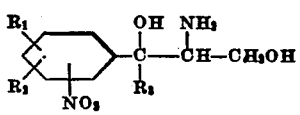

where $R_1$ and $R_2$ are members of the class consisting of hydrogen, halogen, lower alkyl and lower alkoxy radicals and $R_3$ is a member of the class consisting of hydrogen and lower alkyl radicals; and acid addition salts of said compound.

2. A compound of the formula,

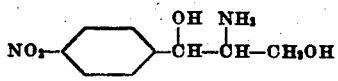

and acid addition salts of said compound.

3. A compound of the formula,

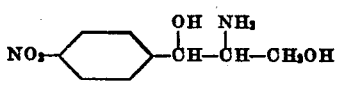

4. [dl]-ψ-1-p-nitrophenyl-2-aminopropane-1,3-diol.

5. [l]-ψ-1-p-nitrophenyl-2-aminopropane-1,3-diol.

6. A hydrohalide salt of [dl]-ψ-1-p-nitrophenl-2-aminopropane-1,3-diol.

7. [dl]-ψ-1-p-nitrophenyl-2-aminopropane-1,3-diol hydrochloride.

8. Process for obtaining an amino diol of formula,

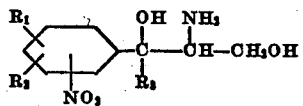

which comprises hydrolyzing an acylated amino diol of formula,

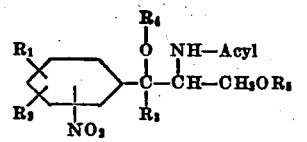

where $R_1$ and $R_2$ are members of the class consisting of hydrogen, halogen, lower alkyl and lower alkoxy radicals, $R_3$ is a member of the class consisting of hydrogen and lower alkyl radicals and $R_4$ and $R_5$ are members of the class consisting of hydrogen and acyl radicals.

9. Process for obtaining a mineral acid salt of an amino diol of formula,

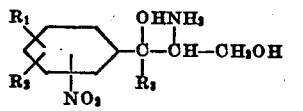

which comprises hydrolyzing an acylated amino diol of formula,

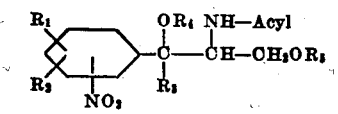

with mineral acid, where $R_1$ and $R_2$ are members of the class consisting of hydrogen, halogen, lower alkyl and lower alkoxy radicals, $R_3$ is a member of the class consisting of hydrogen and lower alkyl radicals and $R_4$ and $R_5$ are members of the class consisting of hydrogen and acyl radicals.

10. Process for obtaining an amino diol of formula,

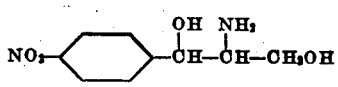

which comprises hydrolyzing an acylated amino diol of formula,

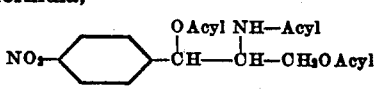

11. Process for obtaining an amino diol of formula,

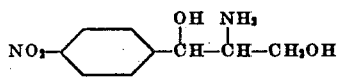

which comprises hydrolyzing an acylated amino diol of formula,

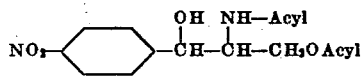

12. Process for obtaining an amino diol of formula,

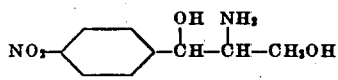

which comprises hydrolyzing an acylated amino diol of formula,

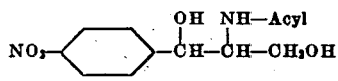

13. Each and every novel product and process herein disclosed.

HARRY M. CROOKS, Jr.
MILDRED C. REBSTOCK.
JOHN CONTROULIS.
QUENTIN R. BARTZ.

REFERENCES CITED

The following references are of record in the file of this patent:

UNITED STATES PATENTS

| Number | Name | Date |
|---|---|---|
| 1,865,880 | Oberlin | July 5, 1932 |
| 2,103,266 | Lott | Dec. 28, 1937 |

OTHER REFERENCES

Cherbuliez et al., "Chemical Abstracts," vol. 25, p. 2132 (1931).